United States Patent
Inaoka et al.

(10) Patent No.: US 6,845,836 B2
(45) Date of Patent: Jan. 25, 2005

(54) ENGINE MOUNTING STRUCTURE FOR MOTORCYCLES

(75) Inventors: Hiroshi Inaoka, Saitama (JP);
Kazutaka Minami, Saitama (JP);
Tetsuaki Maeda, Saitama (JP);
Hirohisa Takahashi, Saitama (JP);
Atsushi Ishida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/274,263

(22) Filed: Oct. 21, 2002

(65) Prior Publication Data

US 2003/0159873 A1 Aug. 28, 2003

(30) Foreign Application Priority Data

Oct. 23, 2001 (JP) ........................................ 2001-325280

(51) Int. Cl.[7] .............................................. B62K 11/00
(52) U.S. Cl. ........................................ 180/228; 180/227
(58) Field of Search ................................ 180/219, 220, 180/227, 228; 248/580, 608, 609, 638

(56) References Cited

U.S. PATENT DOCUMENTS

| | | | | |
|---|---|---|---|---|
| 3,542,146 A | * | 11/1970 | Trigg et al. .................. | 180/228 |
| 3,722,612 A | * | 3/1973 | Issigonis et al. ............ | 180/227 |
| 3,811,528 A | | 5/1974 | Hooper | |
| 4,261,105 A | * | 4/1981 | Love ........................... | 30/383 |
| 4,265,330 A | * | 5/1981 | Silk et al. ................... | 180/230 |
| 4,324,306 A | | 4/1982 | Ishihara et al. | |
| 4,373,602 A | | 2/1983 | Tomita et al. | |
| 4,392,542 A | * | 7/1983 | Aiba ........................... | 180/228 |
| 4,465,157 A | * | 8/1984 | Onishi et al. ................ | 180/228 |
| 4,650,025 A | | 3/1987 | Igarashi et al. | |
| 4,951,930 A | * | 8/1990 | Uno et al. ................... | 267/293 |
| 5,190,269 A | * | 3/1993 | Ikeda et al. ............ | 267/140.12 |
| 5,390,758 A | * | 2/1995 | Hunter et al. ................ | 180/228 |
| 5,829,730 A | * | 11/1998 | Ott ............................. | 248/635 |
| 6,149,176 A | * | 11/2000 | Fujii .......................... | 280/284 |
| 6,254,706 B1 | * | 7/2001 | Ozawa ........................ | 156/64 |

FOREIGN PATENT DOCUMENTS

| | | |
|---|---|---|
| DE | 27 23 352 A1 | 1/1978 |
| DE | 32 35 860 A1 | 4/1983 |
| EP | 1186526 A2 | 3/2002 |
| JP | 2-99481 A | 4/1990 |
| JP | 02099481 | 4/1990 |

* cited by examiner

Primary Examiner—Lesley D. Morris
Assistant Examiner—Paul Royal, Jr.
(74) Attorney, Agent, or Firm—Birch, Stewart, Kolasch & Birch, LLP

(57) ABSTRACT

An engine mounting structure for a motorcycle including a plurality of resilient members for connecting the engine to the vehicle body frame. The resilient member located at the position nearest to the rear wheel is given a resilient property being uniform in the vertical and fore-and-aft directions, and remaining resilient members are given a non-uniform resilient property being hard in the vertical direction and flexible in the fore-and-aft direction. With this configuration, even when the rear wheel moves horizontally in the lateral direction, the influence is attenuated while being transferred to the vehicle body frame. When a resilient member being hard in the vertical direction is used, the behavior of the rear wheel such as the vertical swinging motion or lateral turn can immediately be transferred to the vehicle body frame. Therefore, drivability of the motorcycle during high-speed driving is improved.

20 Claims, 9 Drawing Sheets

ENGINE MOUNTING STRUCTURE FOR MOTORCYCLES

CROSS-REFERENCE TO RELATED APPLICATION

The present application claims priority under 35 U.S.C. §119 to Japanese Patent Application No. 2001-325280, filed on Oct. 23, 2001, the entire contents of which are hereby incorporated by reference.

BACKGROUND OF THE INVENTION

1. Field of the Invention

The present invention relates to a drivability improvement technology for a motorcycle in which the front portion of the rear fork for supporting a rear wheel is mounted on the crankcase of the engine so as to be capable of swinging in the vertical direction.

2. Description of Background Art

A drivability improvement technology for so-called unit swing type motorcycles has been proposed, for example, the technology disclosed in JP-A-2-99481 entitled "FRONT AND REAR WHEEL STEERING APPARATUS FOR MOTORCYCLES". The basic construction of technology is such that, according to FIG. 1 in the same publication, a bracket 8 is mounted on the rear arm brackets 7, 7, via cylindrical rubbers 21, 21, a rear arm 9 is mounted on the bracket 8, and a rear wheel 12 is mounted on the rear arm 9. In addition, as shown in the figure, since the resilient main shafts of the cylindrical rubbers 21, 21 are inclined with respect to the longitudinal centerline of the vehicle body, the resilient members (rubbers) of the cylindrical rubbers 21, 21 resiliently deform to swing the rear arm or the engine in the horizontal direction when the motorcycle is turned around. Thus, a cornering force is exerted on the rear wheel. (In the same publication, see page 4, from line 20 of the upper left column to line 5 of the upper right column).

As is clear from FIG. 1 in the aforementioned publication, in order to incline the cylindrical rubbers 21, 21, a bracket 8 having a complex shape is necessary. At the same time, the rear portions of the rear arm brackets 7, 7 inevitably become complex in shape.

In other words, in the technology disclosed above, since a bracket 8 which corresponds to a intermediate member is additionally required, the number of components increases correspondingly. Further, the structure from the rear arm bracket 7 to the rear arm 9 is upsized, making it difficult to make the vehicle body compact.

In addition, since the costs of the bracket 8 and the rear arm brackets 7, 7 are expensive, the price of the motorcycle increases correspondingly.

SUMMARY AND OBJECTS OF THE INVENTION

Accordingly, it is an object of the invention to provide a motorcycle in which the structure of the portion where a swing arm is joined to the vehicle body frame is simplified to realize a compact vehicle body.

In order to achieve the aforementioned object, a first aspect of the invention provides a motorcycle wherein the front portion of the rear fork for supporting a rear wheel is mounted on the crankcase of the engine so as to be capable of swinging in the vertical direction. Further, the engine is mounted on the vehicle body frame via a plurality of resilient members, and at least one of the resilient members is a resilient member having non-uniform resilient properties being hard in the vertical direction and flexible in the fore-and-aft direction.

When a resilient member being flexible in the fore-and-aft direction is employed, even when the rear wheel is horizontally moved in the lateral direction, the influence thereof is attenuated while being transferred to the vehicle body frame. When a resilient member being hard in the vertical direction is used, the behavior of the rear wheel such as the vertical swinging motion or lateral turn can immediately be transferred to the vehicle body frame. Therefore, the drivability of the motorcycle during high-speed driving can be improved.

In the aforementioned improvement, by employing a resilient member having non-uniform resilient properties and the same dimensions (outer diameter, inner diameter, and length) as the resilient member for mounting engine in the related art, it is not necessary to modify the shape of the vehicle body frame or the rear fork, or to add a bracket. Therefore, according to this first aspect of the present invention, the structure of the portion where the swing arm is joined to the vehicle body frame is simplified, and thus the compact structure of the vehicle body frame is realized.

According to a second aspect of the present invention, the resilient member that is located at the nearest position to the rear wheel out of a plurality of resilient members is a resilient member having resilient properties which are uniform in the vertical direction and in the fore-and-aft direction. On the other hand, the other resilient members have non-uniform resilient properties.

The resilient member employed for placing at the position nearest to the rear wheel is a resilient member having resilient properties being uniform in the vertical direction and in the fore-and-aft direction. Therefore, when mounting the engine on the vehicle body frame with a plurality of resilient members, the largest load is exerted on the resilient member located at the position nearest to the rear wheel. Therefore, the behavior of the rear wheel can immediately be transferred to the vehicle body frame and the drivability can be improved by using a resilient member which is tough in every directions only at this position.

According to a third aspect of the present invention, a positioning portion for determining the orientation in the vertical direction and in the fore-and-aft directions is provided on the resilient member having non-uniform resilient properties. Also, a receiving portion corresponding to the positioning portion is provided on the vehicle body frame.

When using the resilient member having different resilient properties in the vertical direction from those in the fore-and-aft direction, it is necessary to prevent the resilient member from being mounted in the wrong orientation, for example, in the state of being rotated by 90° from the correct position. In order ensure proper orientation, the positioning portion and the receiving portion are provided so that the mounting direction of the resilient member having an orientation can be identified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

The principal portions of the present invention will be described in conjunction with FIG. 5 to FIG. 10, and the motorcycle, which is a foundation thereof, will be described in FIG. 1 thorough FIG. 4.

In the description, "front", "rear", "left", "right", "up", "down" designate the directions viewed from the driver, and Fr designates the front side, Rr designates the rear side, L designates the left side, the right designate the right side, and CL designates the center of the vehicle body (widthwise center of the vehicle).

Figure 1:
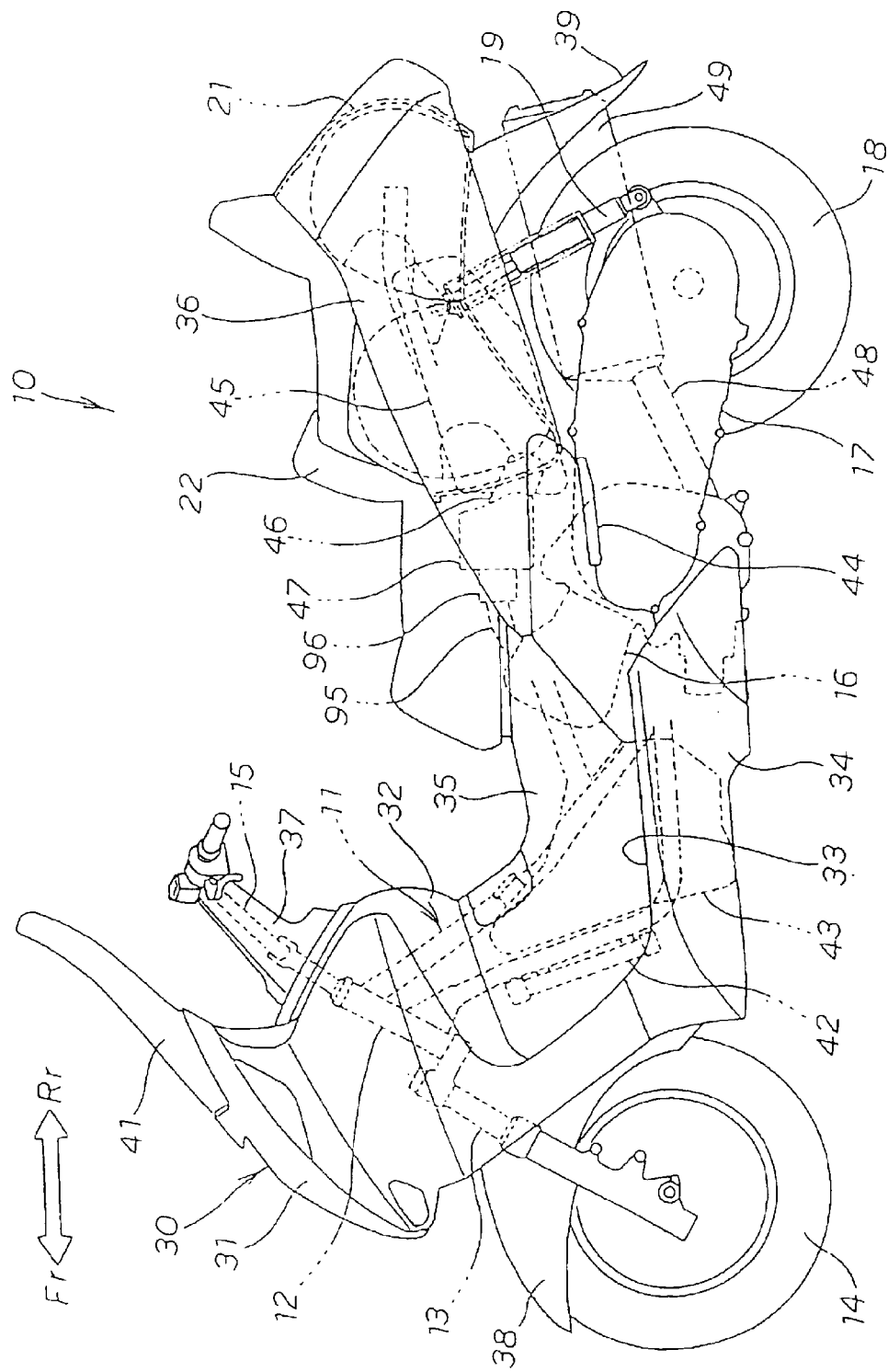
FIG. 1 is a left side view of a motorcycle according to the present invention.

FIG. 1 is a left side view of the motorcycle according to the present invention.

A motorcycle 10 is a scooter type motorcycle including a vehicle body frame 11, a front fork 13 mounted on a head pipe 12 of the vehicle body frame 11, a front wheel 14 mounted on the front fork 13, a handle 15 connected to the front fork 13, and an engine 16 mounted on the rear portion of the vehicle body frame 11. Also included are a power transmission mechanism 17 mounted on the engine 16 so as to be capable of swinging in the vertical direction, a rear wheel 18 mounted on the power transmission mechanism 17, a rear cushion unit 19 for suspending the rear end portion of the power transmission mechanism 17 to the vehicle body frame 11, a storage box 21 mounted on the upper rear portion of the vehicle body frame 11, and a seat 22 disposed on the storage box 21 and mounted so as to be openable and closable as a main components. The seat 22 is a double seat.

The motorcycle 10 is constructed by covering the vehicle body frame 11 with a body cover 30. The body cover 30 includes a front cover 31 for covering the front portion of the head pipe 12, and an inner cover 32 for covering the rear portion of the front cover 31. Also provided are left and right low deck floor steps 33 for placing the drivers feet, left and right floor skirts 34 extending downward from the outer edges of the low deck floor steps 33, a center cover 35 extending rearward from the inner cover 32 for covering the longitudinal center of the vehicle body frame 11, and a rear cover 36 extending rearward from the center cover 35 for covering the rear portion of the vehicle body frame 11.

FIG. 1 also shows a handle cover 37, a front fender 38, a rear fender 39, a wind screen 41, an engine cooling radiator 42, a fuel tank 43, a passenger step 44, an air cleaner 45, a connecting tube (joint tube) 46, an air chamber 47, an engine exhaust pipe 48, and an exhaust muffler 49.

Figure 2:
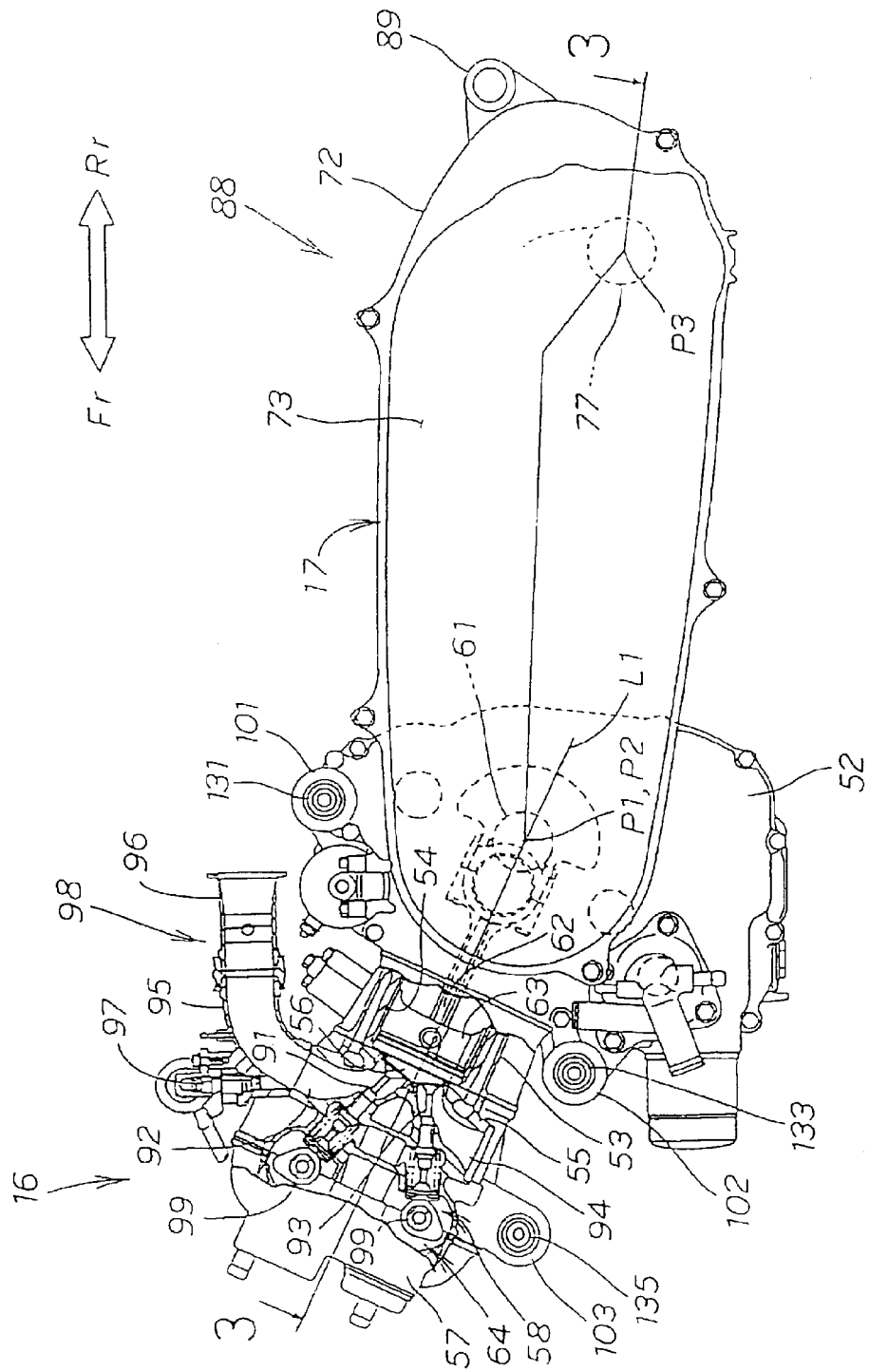
FIG. 2 is a left side view of an engine and a power transmission mechanism of the motorcycle according to the present invention.

FIG. 2 is a left side view of the engine and the power transmission mechanism of a motorcycle according to the present invention.

The engine 16 is a 4-cycle, 2-cylinder water-cooled engine having a cylinder 54 extending forward from the crankcase 52. The axis of the cylinder 54 is designated by L1.

Figure 3:
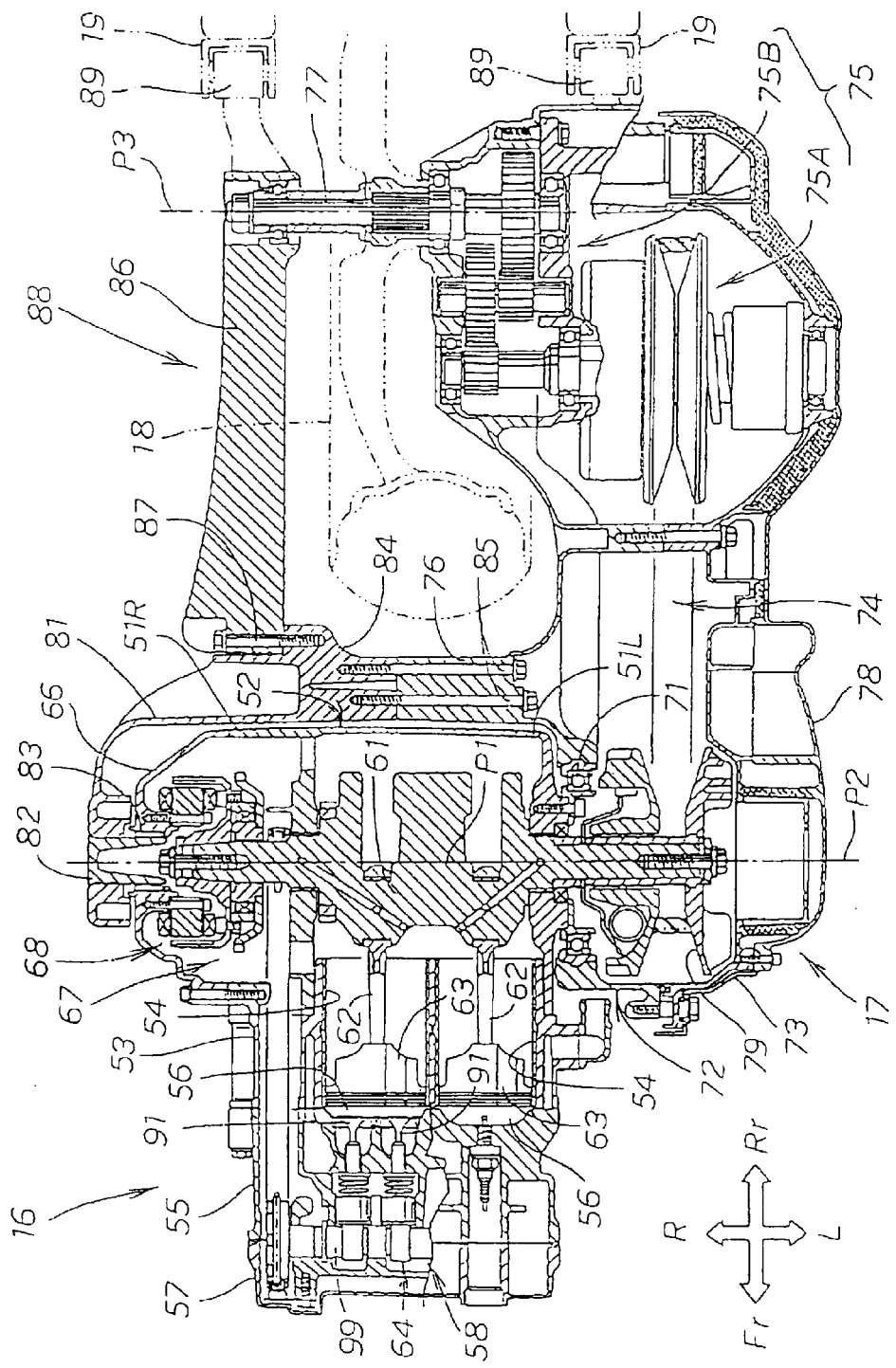
FIG. 3 is a cross sectional view taken along the line 3—3 in FIG. 2.

FIG. 3 is a cross sectional view taken along the line 3—3 in FIG. 2.

The case portion of the engine 16 includes a crankcase 52 formed by joining a left and a right case halves 51L, 51R with a bolt, a cylinder block 53 attached on the front portion of the crankcase 52 with a bolt, two cylinders 54, 54 provided on the left and the right in the cylinder block 53, a cylinder head 55 attached on the front portion of the cylinder block 53 with a bolt, combustion chambers 56, 56 formed in the cylinder head 55, a head cover 57 attached on the front portion of the cylinder head 55 with a bolt, and a mobile valve chamber 58 formed between the cylinder head 55 and the head cover 57.

The engine 16 includes a crankshaft 61 rotatably mounted on the crankcase 52 so as to extend in the lateral direction, pistons 63, 63 reciprocating in the cylinders 54, 54 connected to the crankshaft 61 via the connecting rods 62, 62, and a mobile valve mechanism 64 stored in the mobile valve chamber 58.

A generator storage chamber 67 is formed between the right case half 51R and the generator cover 66 by connecting the generator cover 66 on the right side portion of the right case half 51R with a bolt, and a generator 68 is stored in the generator storage chamber 67. The generator 68 is connected to the right end portion of the crankshaft 61.

Since the generator cover 66 is fixed on the crankcase 52, it is considered to be a part of the crankcase 52 in the present invention.

The power transmission mechanism 17 includes a transmission mechanism case 72 mounted on the left case half 51L at the front portion thereof so as to be capable of swinging in the vertical direction via a bearing 71 and extending rearward, a case cover 73 for closing the side opening of the transmission mechanism case 72, a transmission mechanism storage chamber 74 formed between the transmission mechanism case 72 and the case cover 73, and a transmission mechanism 75 stored in the transmission mechanism storage chamber 74. The transmission mechanism case 72 is formed with a boss portion 76 extending from a longitudinally midpoint thereof toward the center of the vehicle width.

The transmission mechanism 75 is a combined structure including a belt-type speed change mechanism 75A connected to the crankshaft 61 and a gear mechanism 75B connected to the belt-type speed change mechanism 75A, having a rear wheel axle 77 connected on the output side of the gear mechanism 75B and rotatably supporting the rear wheel axle 77. The reference numeral 78 designates a cover.

On the other hand, the generator cover 66 includes a front arm 81 mounted so as to be capable of swinging in the vertical direction. More specifically, a supporting shaft 82 is integrally mounted at the front of the front arm 81, and the supporting shaft 82 is rotatably supported by the generator cover 66 via a bearing 83.

The front arm 81 extends rearward, and includes a boss portion 84 projecting from the rear end thereof along the rear portion of the crankcase 52 toward the center of the width of the vehicle body, and the boss portion 76 of the transmission mechanism case 72 is connected to the boss portion 84 by means of bolts 85, 85. In addition, a rear arm 86 is connected to the rear portion of the front arm 81 with a bolt 87. The rear arm 86 extends rearward, and a rear wheel axle 77 is rotatably supported at the rear end portion thereof.

Such combined structure of the transmission mechanism case 72 and the front and rear portion arms 81, 86 constitutes a rear fork (swing arm) 88 in substantially H-shape in plan view. Therefore, the front portion of the rear fork 88 supporting the rear wheel 18 via the rear wheel axle 77 can be mounted on the crankcase 52 so as to be capable of swinging in the vertical direction.

This example is characterized in that the center P2 of the swinging motion of the rear fork 88, in other words, the center P2 of the swinging motion of the transmission mechanism case 72 and the front arm 81, coincides with the center P1 of the crankshaft 61.

If the center P2 of the swinging motion of the rear fork 88 were to be configured so as not to coincide with (offset from) the center P1 of the crankshaft 61, the swinging angle of the mechanism for transmitting a power from the crankshaft 61 to the rear wheel 18 (transmission mechanism) would differ from the swinging angle of the rear fork 88. Therefore, the construction inevitably would become complex.

In contrast to this, according to the present invention, the center P2 of the swinging motion of the rear fork 88 coincides with the center P1 of the crankshaft 61. More specifically, the center of the input side of the transmission mechanism 75 and the center P2 of the swinging motion of the transmission mechanism case 72 are adjusted to coincide with the center P1 of the crankshaft 61 by connecting a driving pulley 79 of the transmission mechanism 75 directly to the crankshaft 61. As a consequence, the swinging angle of the transmission mechanism 75 is identified to the swinging angle of the rear fork 88. Therefore, the transmission mechanism 75 may be simplified (mechanism for transmitting a power from the crankshaft 61 to the rear wheel 18).

Further, FIG. 3 shows that the brackets 89, 89 are provided for connecting the lower portions of the left and the right rear cushion units 19, 19 to the rear end of the transmission mechanism case 72 and the rear end of the rear arm 86.

Referring back to FIG. 2 now, the description will be continued. The cylinder head 55 includes an air intake port 92 continuing to a combustion chamber 56 and having an air intake valve 91, and an exhaust port 94 continuing to the combustion chamber 56 and having an exhaust valve 93 formed integrally with each other. When the engine 16 is viewed from the side, the air intake port 92 is opened upward, and the exhaust port 94 opened downward.

An inlet pipe 95 connected to the air intake port 92 extends rearwardly of the cylinder head 55, and includes a throttle valve 96 connected at the rear end thereof (upstream end). The upstream end of the throttle valve 96 faces rearward. The inlet pipe 95 is provided with a fuel injection device (injector) 97 for injecting fuel toward the air intake valve 91.

The combined structure of the air intake port 92, the inlet pipe 95 and the throttle valve 96 defines an air intake passage 98. In other words, the air intake passage 98 extends rearward from the upper portion of the cylinder 54, and the air intake port of the air intake passage 98 is oriented toward the rear. Then the air intake port of the air intake passage 98, or the upstream end of the throttle valve 96 is connected to the air cleaner 45 through the air chamber 47 as shown in FIG. 1. The reference numerals 99, 99 designate camshafts of the mobile valve mechanism 64.

The engine 16 is provided with an upper mounting bracket 101 and a lower mounting bracket 102 on the crankcase 52, and a front mounting bracket 103 on the lower portion of the cylinder head 55. More specifically, the upper mounting bracket 101 is provided at the position higher than the cylinder 54 and the lower mounting bracket 102 and the front mounting bracket 103 are provided at the positions lower than the cylinder 54.

Figure 4:
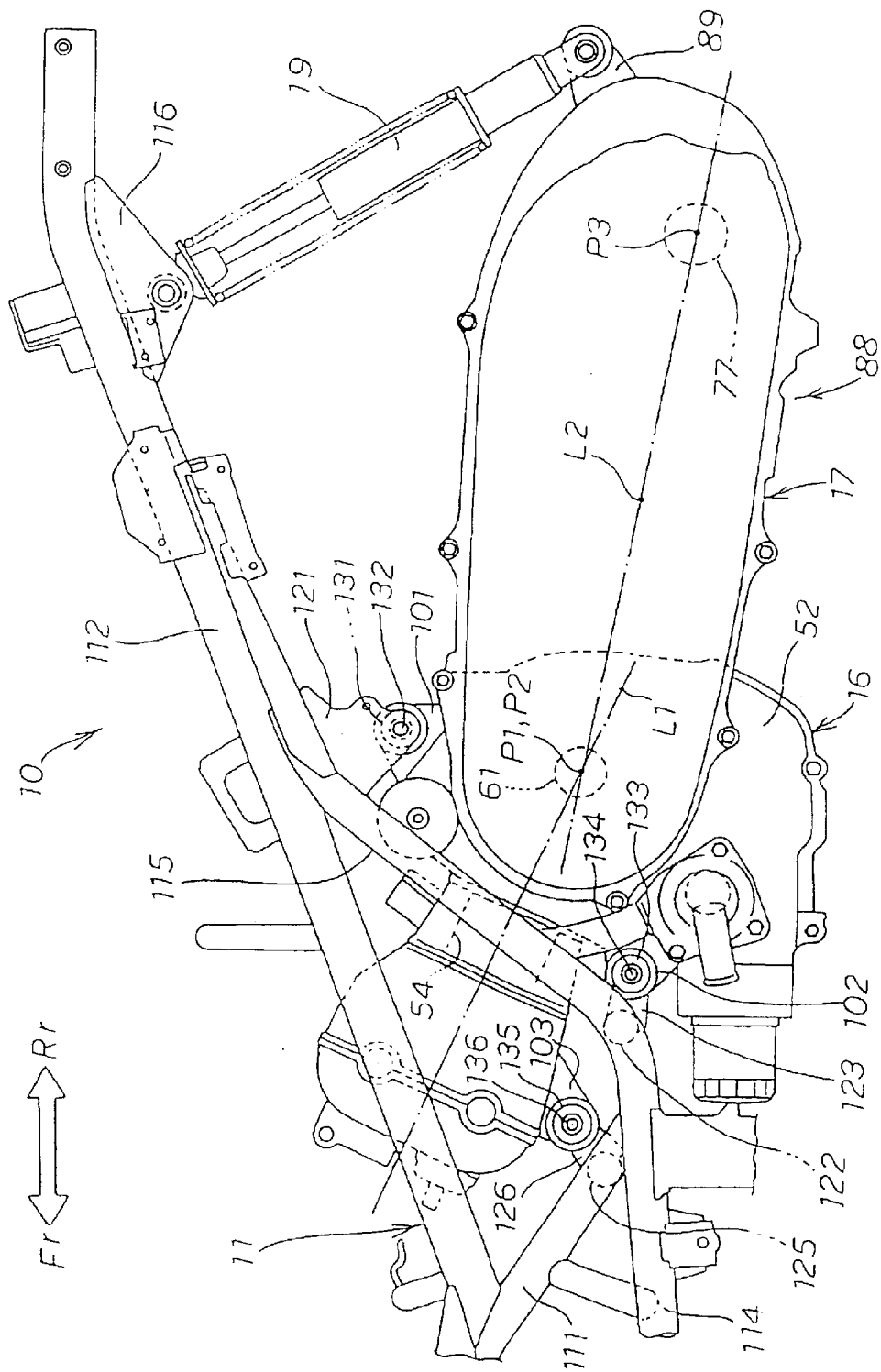
FIG. 4 is a left side view of the rear portion of the vehicle body frame, the engine, and the power transmission mechanism of the motorcycle according to the present invention.

FIG. 4 is a left side view of the rear portion of the vehicle body frame, the engine, and the power transmission mechanism of the motorcycle according to the present invention.

The left and the right upper pipes 115, 115 (only the left upper pipe is shown in the figure hereinafter) as uprising frame members of the vehicle body frame 11 are members that extend substantially orthogonal to the cylinder 54, that is, substantially orthogonal to the axis L1 of the cylinder in side view. The left and right upper pipes 115, 115 are provided with the left and right upper brackets 121, 121 mounted at the upper ends thereof, a first cross member 122 laid between the lower ends thereof, and a lower bracket 123 provided on the first cross member 122. The left and right main pipes 111, 111 are provided with the second cross member 125 laid between the lower ends thereof, and the front bracket 126 provided on the second cross member 125.

The line passing through the center P1 of the crankshaft 61 and the center P3 of the rear wheel axle 77 is designated by L2.

The engine 16 is mounted on the vehicle body frame 11 according to the following three points in side view.

The first mounting point for the engine 16 is the upper mounting bracket 101, and is formed over the crankcase 52 of the engine 16. The upper mounting bracket 101 is connected to the upper bracket 121 on the vehicle body frame 11 side by a first resilient member 131, which is referred to as an engine mount, and a bolt 132. Detailed description will be given in conjunction with FIG. 6.

The second point for mounting the engine 16 is the lower mounting bracket 102. The lower mounting bracket 102 is connected to the lower bracket 123 on the vehicle body frame 11 side by a second resilient member 133, which is referred to as a engine mount, and a bolt 134. It will be described in conjunction with FIG. 7 in detail.

The third point for mounting the engine 16 is the front mounting bracket 103. Front mounting bracket 103 is connected to the front bracket 126 on the vehicle body frame 11 side by a third resilient member 135, which is referred to as an engine mount, and a bolt 136. It will also be described in conjunction with FIG. 7 in detail.

Figure 5:
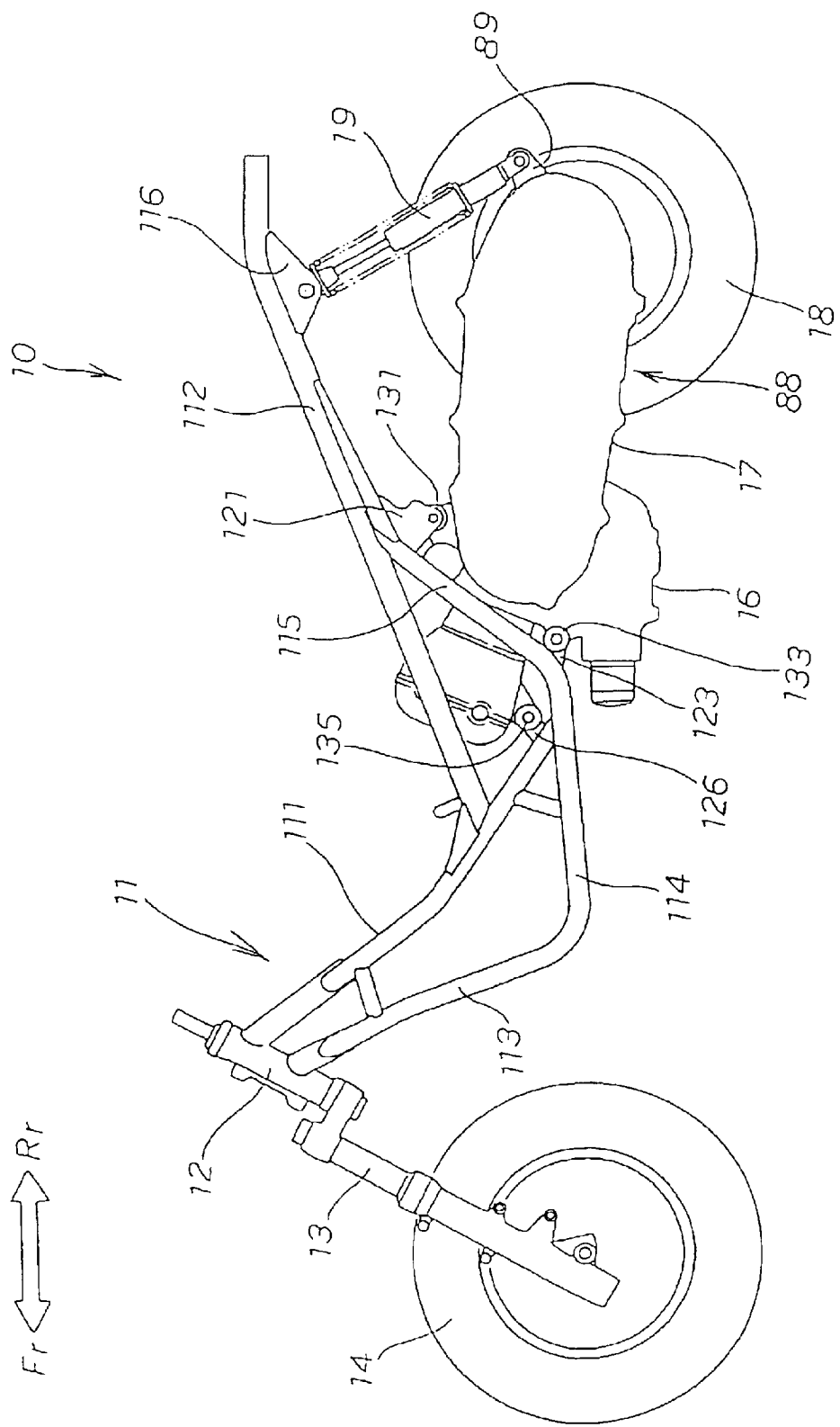
FIG. 5 is a left side view of the vehicle body frame of the motorcycle according to the present invention.

FIG. 5 is a left side view of the vehicle body frame of the motorcycle according to the present invention.

The vehicle body frame 11 is a double cradle type frame in which a main pipe 111 extends from the head pipe 12 obliquely downward toward the rear, a seat rail 112 extends from the longitudinally intermediate portion of the main pipe 111 obliquely upward toward the rear, and a down pipe 113 extends from he head pipe 12 at the position downwardly of the main pipe 111 obliquely downward toward the rear, a lower pipe 114 extends rearward from the lower end of the down pipe 113. The lower end of the main pipe 111 is joined to the longitudinally intermediate portion of the lower pipe 114, the upper pipe 115 (uprising frame member) extends from the rear end of the lower pipe 114 obliquely upward toward the rear, and the rear end of the upper pipe 115 is connected to the longitudinally intermediate portion of the seat rail 112.

FIG. 5 shows that brackets 116, 116 are provided for connecting the upper portions of the left and right rear cushion units 19, 19 (only the left one, that is the one on the near side, is shown in the figure, hereinafter) to the rear portion of the seat rail 112. The left and right side of the rear portion of the rear fork 88 can be suspended from the vehicle body frame 11 via the rear cushion units 19, 19 by connecting the rear cushion units 19, 19 between the brackets 89, 89 of the rear fork 88 and the brackets 116, 116 of the seat rail 112.

It is shown that the engine 16 is mounted on the vehicle body frame 11 side at the three points of the first resilient member 131, the second resilient member 133, and the third resilient member 135. The first resilient member 131, the second resilient member 133 and the third resilient member 135 are described now below.

Figure 6:
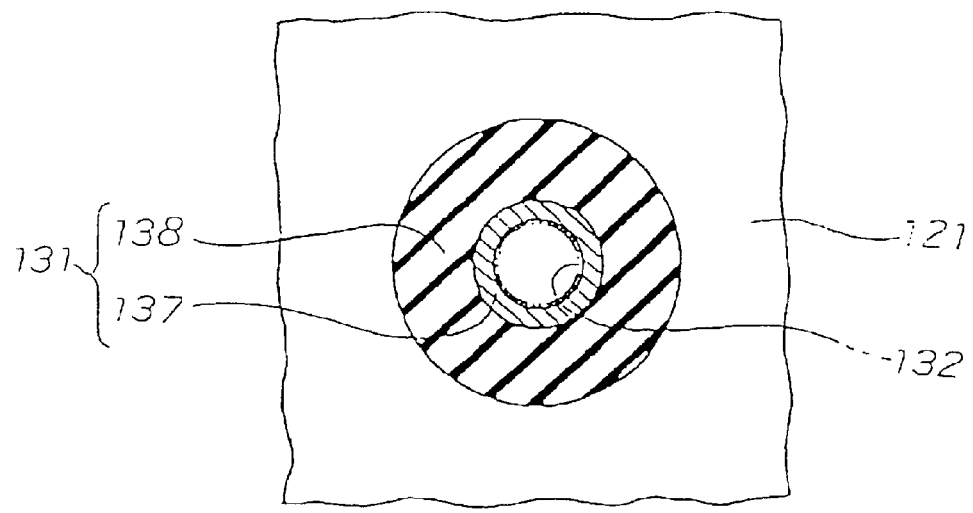
FIG. 6 is a schematic drawing of a first resilient member according to the present invention.

FIG. 6 is a schematic drawing showing the first resilient member according to the present invention. The first resilient member 131 includes a cylindrical rubber 138 baked integrally to the inner cylinder formed of steel pipe 137, and is mounted by inserting the cylindrical rubber 138 into the upper bracket 121 and a bolt 132 shown by a phantom line is inserted into the inner cylinder 137.

Since the cylindrical rubber 138 is uniform in thickness in the fore-and-aft (lateral in the figure) direction and the vertical direction and is uniform in quality, the first resilient member 131 is a resilient member having uniform resilient properties in the vertical and fore-and-aft directions.

Figure 7:
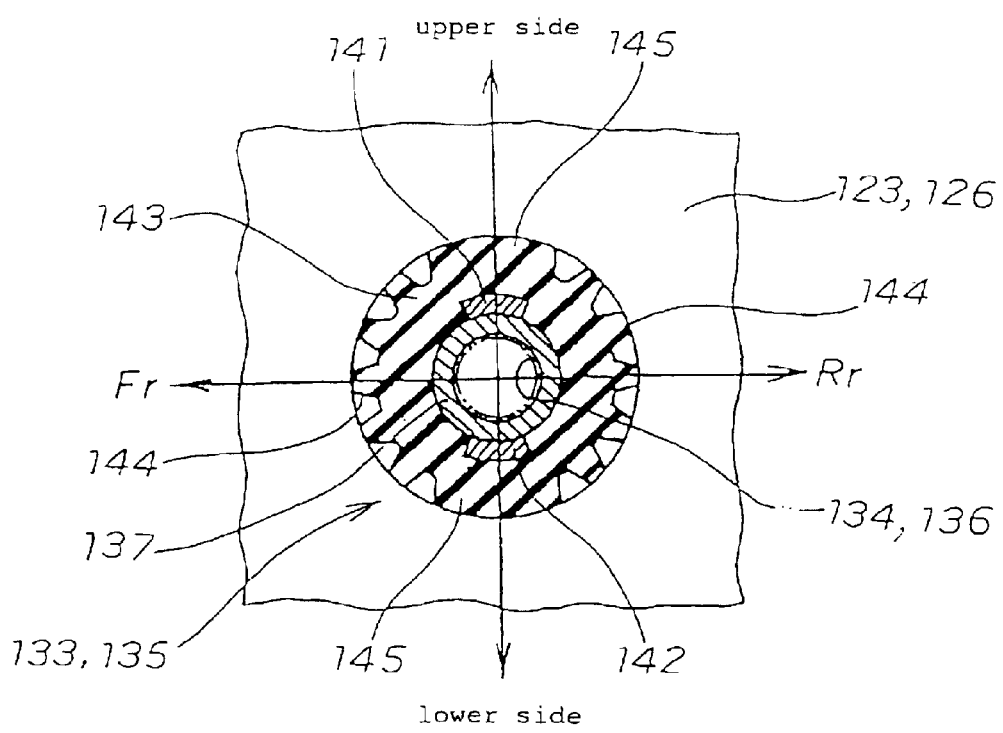
FIG. 7 is a schematic drawing showing a second and third resilient member according to the present invention.

FIG. 7 is a schematic drawing of the second and third resilient members according to the present invention. Each of the second and third resilient members 133, 135 includes an inner cylinder formed of steel pipe 137 and an upper core metal 141 attached on the upper portion of the outer peripheral surface of the inner cylinder 137, a lower core metal 142 attached on the lower portion of the outer peripheral surface of the inner cylinder 137, and a rubber 143 having a non-uniform cross section. The rubber 143 having a non-uniform cross section includes a plurality (five on both of the left and the right in the figure) of gear teeth shaped projections 144 . . . ( . . . designates plural number, hereinafter) at the front (Fr) and the rear (Rr) and uniform thickness sections 145, 145 on the upper and lower portions.

The rubber 143 having a non-uniform cross section is mounted by being inserted into the lower bracket 123 or the front bracket 126, and then passing the bolt 134 or 136 shown by the phantom line into the inner cylinder 137.

Next, the resilient properties of the rubber 143 having a non-uniform cross will be described.

The projections 144 . . . are deformed by a small force. As a consequence, the rubber 143 having a non-uniform cross section can be said to have a property being flexible in the fore-and-aft direction (Fr-Rr).

As regards the vertical direction, due to the existence of the core metals 141, 142, thickness of the uniform thickness section 145, that is, the thickness of the rubber decreases. When the thickness of the rubber decreases, the rubber can be only minimally deformed. As a consequence, the rubber 143 having a non-uniform cross section is hard in the vertical direction.

In other words, it can be said that the second and third resilient members 133, 135 are resilient members having non-uniform resilience properties being hard in the vertical direction, and flexible in the fore-and-aft direction.

The non-uniform resilient properties may be achieved by a known method such as, a method of changing the thickness of the rubber layer by providing lightening holes on the rubber layer, or a method of combining hard rubber and soft rubber, or other methods. However, lightening of the rubber layer requires a highly accurate metal mold for forming cavities correctly, and thus the manufacturing costs increase correspondingly. In the method of combining different types of rubber, a high technology of manufacture is required, and thus the manufacturing costs increase as well.

In contrast to these more expensive methods, according to the present invention, the resilient property in the vertical direction can be changed easily by changing the thickness of the core metals 141, 142, and the resilient property in the fore-and-aft direction can be changed easily by changing the number or configurations of the projections 144 . . . . Thus, with the present invention, manufacturing costs may be reduced.

Figure 8:
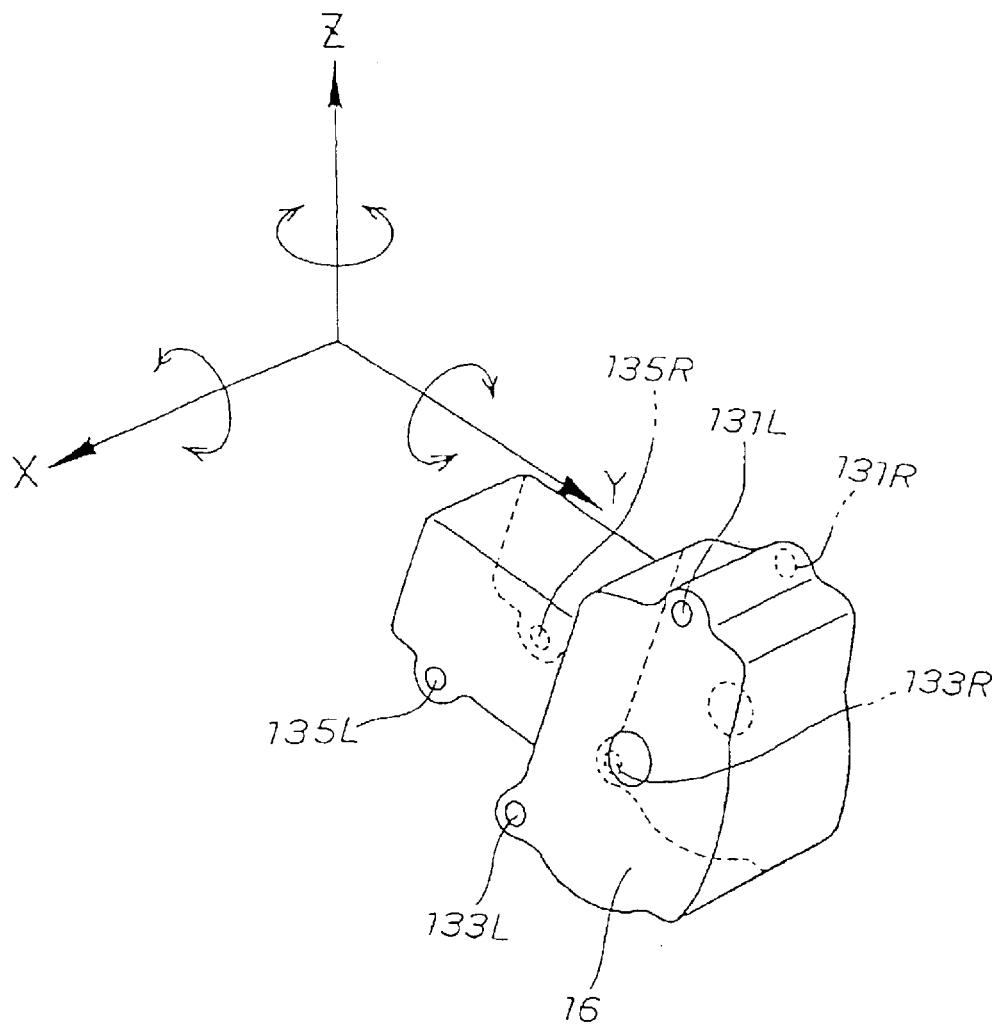
FIG. 8 is an explanatory drawing showing the operation of the resilient member according to the present invention.

FIG. 8 is an explanatory drawing showing the operation of the resilient member according to the present invention. X, Y, and Z designate axes.

Though the engine 16 appears to be mounted at only three points in side view, as is shown in FIG. 8, the engine is actually mounted with six resilient members in total. As can be seen, the left and the right first resilient members 131L, 131R are disposed on the upper rear portion of the engine 16, the left and the right second resilient members 133L, 133R are disposed on the lower rear portion of the engine 16, and the left and the right third resilient members 135L, 135R are disposed on the front portion of the engine 16.

When the rear wheel, not shown, is moved upward and downward due to a reaction force from the road surface, the engine 16 is apt to rotate about the X-axis. This phenomenon is referred to as pitching. A force in the vertical direction is exerted on the resilient members 131L, 131R, 133L, 133R, 135L, and 135R. As described in conjunction with FIG. 6 and FIG. 7, the resilient members 131, 133, and 135 exhibit a resilient property being hard in the vertical direction.

When the rear wheel, not shown, tilts downward to the right or to the left, the engine 16 is apt to rotate about the Y-axis. This phenomenon is referred to as rolling. In this case as well, a force in the vertical direction is exerted to the resilient members 131L, 131R, 133L, 133R, 135L, and 135R, and thus the resilient members 131, 133, 135 exhibit a resilient property being hard in the vertical direction.

On the other hand, when the rear wheel, not shown, swings to the right or to the left in the horizontal direction, the engine 16 is apt to rotate about the Z-axis. This phenomenon is referred to as yawing. In this case as well, a force in the fore-and-aft direction is applied to the resilient members 131L, 131R, 133L, 133R, 135L, and 135R. The hardness of the first resilient members 131L, 131R is not changed, but the second and the third resilient members 133L, 133R, 135L, and 135R exhibit flexible resilient property in the fore-and-aft direction as described in conjunction with FIG. 7.

When the resilient property is flexible, the rear wheel can behave independently of the vehicle body. On the other hand, when it is hard, the influence of the movement of the rear wheel is directly transmitted to the vehicle body.

When considering the high-speed travel of the motorcycle, there is little influence of pitching (vertical shaking) or rolling (lateral rotation) on the ride quality for the rider. That is because pitching (vertical shaking) can be absorbed by the damping action of the front fork, and rolling (lateral rotation) can be absorbed by the slight lateral shaking of the vehicle body on a basis of the characteristic of the vehicle.

On the other hand, since yawing (lateral horizontal shaking) effects the ride quality, it is desirable to prevent a yawing component from being transmitted directly from the rear wheel to the vehicle body frame, and thus, to the driver. In this regard, according to the invention, a yawing is only minimally transmitted, and thus the driver is able to enjoy a comfortable ride.

In this embodiment, a resilient member having resilient properties being uniform in the vertical and fore-and-aft direction is employed in the first resilient member 131 located at the position nearest to the rear wheel. The reason is that when the engine is mounted on the vehicle body frame with a plurality of resilient members, a load exerted on the first resilient member 131 at the position nearest to the rear wheel shows the maximum value. Therefore, at this position it is necessary to use a resilient member that is tough in every direction.

While the first resilient member 131 in FIG. 6 can be oriented in any direction, the orientation is an important matter for the second and third resilient members 133, 135 in FIG. 7. The second and third resilient members 133, 135 should be oriented in such a manner that the core metals 141, 142 are oriented in the vertical direction.

In other words, when employing the second and third resilient members 133, 135, having a means to ensure proper orientation is important. The technology of ensuring this proper orientation will be described below.

Figure 9:
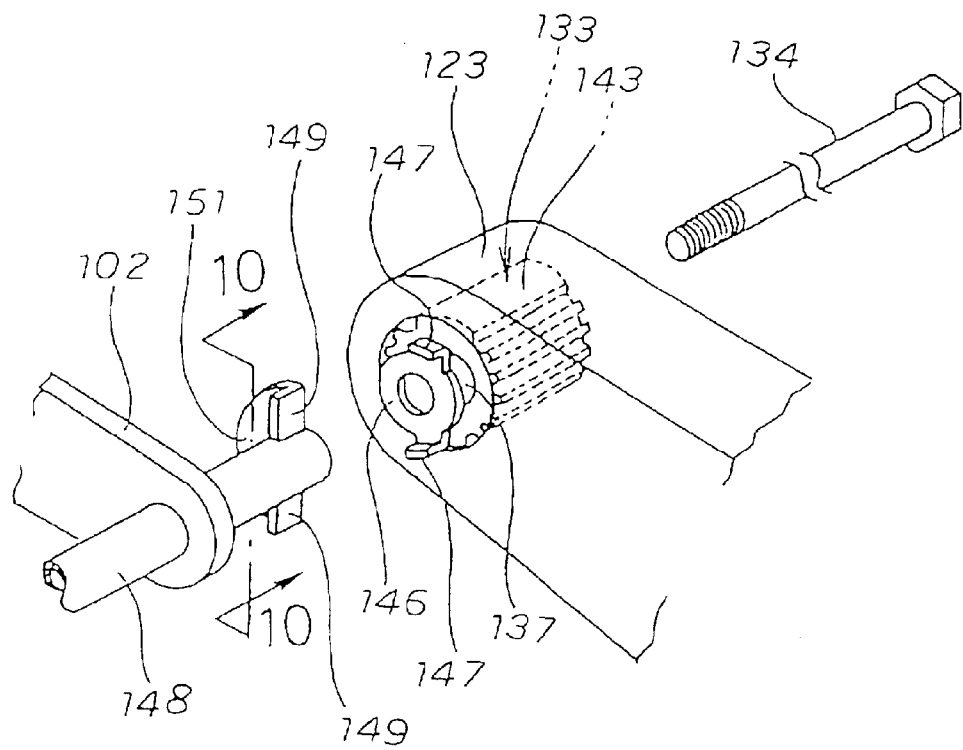
FIG. 9 is an exploded drawing of the second resilient member and the peripheral components according to the present invention.

FIG. 9 is an exploded view of the second resilient member according to the present invention and the peripheral components thereof. The second resilient member 133 is attached with a perforated disc 146 at one end of its inner cylinder 137, and two upper and lower positioning portions 147, 147 are formed on the perforated disc 146 so as to swell out therefrom. On the other hand, a pipe 148 mounted integrally on the lower mounting bracket 102 is provided with two upper and lower receiving portions 149, 149 and a semi-circular plate 151 laid between these receiving portions 149, 149. Then the perforated disc 146 is abutted against the pipe 148, and the bolt 134 is inserted into the inner cylinder 137, the perforated disc 146, and the pipe 148 to assemble.

Figure 10:
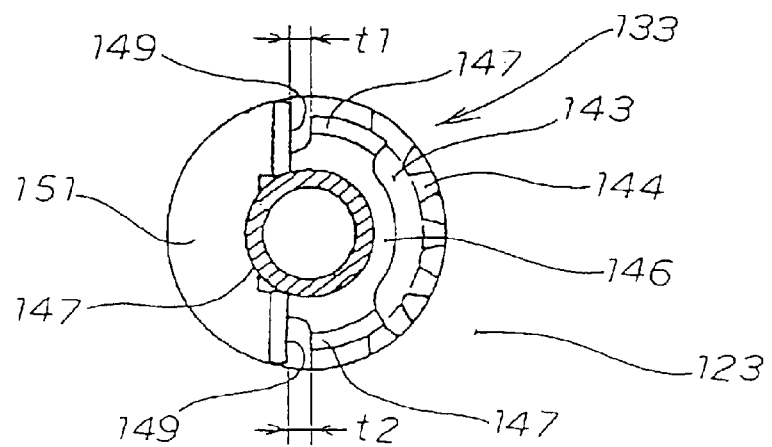
FIG. 10 is a drawing when viewed in the direction of the arrows shown by 10—10 in FIG. 9.

FIG. 10 is a drawing viewed in the direction shown by the arrows 10—10 in FIG. 9. When a semi-circular plate 151 and the upper and lower receiving portions 149, 149 are mounted on the pipe 148, the perforated disc 146 and two upper and lower positioning portions 147, 147 are mounted on the rubber 143 having a non-uniform cross section, and the rubber 143 having a non-uniform cross section is correctly built in the lower bracket 123, clearances t1, t2 are secured between the receiving portions 149, 149 and the positioning portions 147, 147.

When the rubber 143 having a non-uniform cross section is incorrectly built in the lower bracket 123, the clearances t1, t2 change significantly from the prescribed value, or the positioning portion 147 interferes with the semi-circular plate 151 and thus preventing assembly. Therefore, wrong assembly of the second resilient member 133 can easily be detected by the positioning portion 147 and the receiving portion 149.

Even when the rubber 143 having a non-uniform cross section is rotated by some reasons after assembly, the positioning portion 147 interferes with the receiving portion 149, and it cannot be rotated further. Thus the rubber 143 having a non-uniform cross section can be prevented from rotation.

The shape of the positioning portion 147 and the receiving portion 149 are not limited to the above-described embodiment, and may be such that a pin on one side and a hole on the other side are fitted together.

Figure 11:
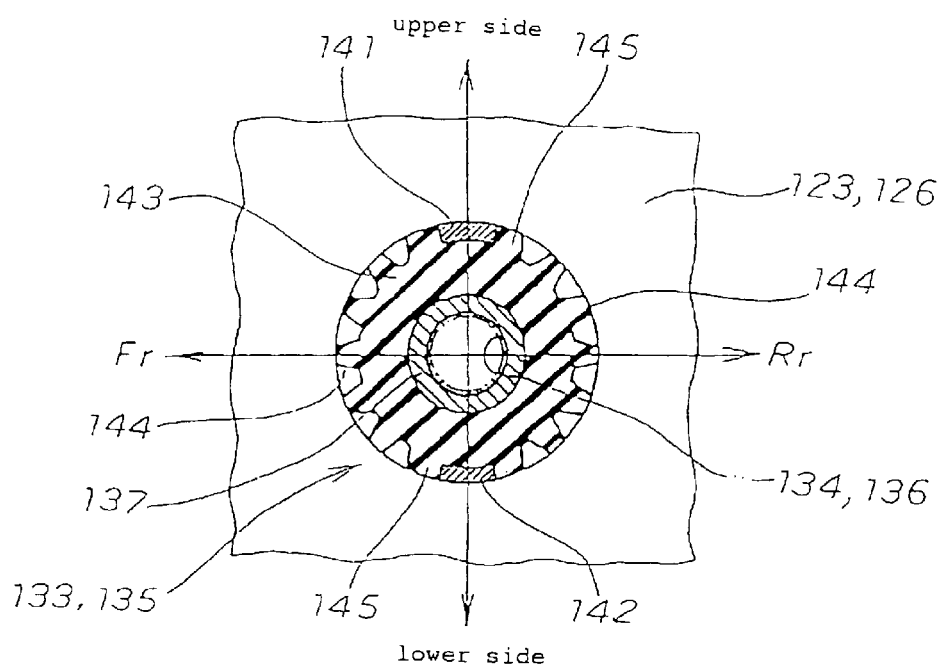
FIG. 11 is another embodiment of FIG. 7.

FIG. 11 shows another embodiment of FIG. 7, in which the core metals 141, 142 are disposed on the outer peripheral portion of the rubber 143 having a non-uniform cross section. Other components are designated by the same reference numerals as those in FIG. 7, and will not be described. In other words, the core metals 141, 142 may be provided at any position on the uniform thickness sections 145, 145.

With the arrangement described above, the present invention achieves the following effects.

According to the first aspect of the present invention, the engine is mounted on the vehicle body frame via a plurality of resilient members, and at least one of the resilient members is a resilient member having non-uniform resilient properties being hard in the vertical direction and flexible in the fore-and-aft direction. This configuration enhances drivability of the motorcycle during high-speed driving. In the aforementioned improvement, by employing a resilient member having non-uniform resilient properties and the same dimensions (outer diameter, inner diameter, and length) as the resilient member for mounting engine in the related art, it is not necessary to modify the shape of the vehicle body frame or the rear fork, or to add a bracket. Therefore, the structure of the portion where the swing arm is joined to the vehicle body frame is simplified, and thus a compact vehicle body structure can be realized.

According to the second aspect of the present invention, the resilient member that is located at the position nearest to the rear wheel out of a plurality of resilient members is a resilient member having resilient properties being uniform in the vertical direction and in the fore-and-aft direction. The other resilient members have non-uniform resilient properties. The resilient member employed at the position nearest to the rear wheel is a resilient member having resilient properties being uniform in the vertical direction and in the fore-and-aft direction. Therefore, when mounting the engine on the vehicle frame having a plurality of resilient members, the largest load is exerted on the resilient member located at the position nearest to the rear wheel. Therefore, the behavior of the rear wheel can immediately be transferred to the vehicle body frame and the drivability can be improved by using a resilient member which is tough in every direction at this position, but not at the other positions.

According to the third aspect of the present invention, a positioning portion for determining the orientation in the vertical direction and in the fore-and-aft directions is provided on the resilient member having non-uniform resilient properties, and a receiving portion corresponding to the positioning portion is provided on the vehicle body frame. When using the resilient member of having non-uniform resilient properties, it is necessary to prevent the resilient member from being mounted in the wrong orientation, for example, in the state of being rotated by 90° from the correct position. In order to prevent improper orientation, the positioning portion and the receiving portion are provided so that the mounting direction of the resilient member requiring orientation can be identified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine mounting structure for motorcycles, comprising:
   a front portion of a rear fork for supporting a rear wheel mounted on a crankcase of an engine so as to be capable of swinging in a vertical direction, the crankcase being provided with a plurality of mounting brackets;
   a vehicle body frame provided with a plurality of brackets corresponding to the mounting brackets on the crankcase; and
   a plurality of resilient members for connecting each of the plurality of mounting brackets on said crankcase with each of the plurality of corresponding brackets of the vehicle body frame, wherein
   at least one of the plurality of resilient members is a non-uniform resilient member having non-uniform resilient properties which are hard in a vertical direction and flexible in a fore-and-aft direction with respect to the vehicle body frame, and
   wherein a center of swinging motion of the rear fork coincides with a center of a crankshaft of the engine.

2. The engine mounting structure for motorcycles according to claim 1, wherein a first of the plurality of resilient members that is located at a position nearest to the rear wheel is a uniform resilient member having uniform resilient properties in both the vertical direction and in the fore-and-aft direction, and others of said plurality of resilient members are said non-uniform resilient members having non-uniform resilient properties.

3. The engine mounting structure for motorcycles according to claim 1, further comprising:
   a positioning portion for determining the orientation in the vertical direction and in the fore-and-aft directions is provided on the at least one of the plurality of resilient members having non-uniform resilient properties;
   a receiving portion corresponding to the positioning portion is provided on the vehicle body frame.

4. The engine mounting structure for motorcycles according to claim 1, wherein said plurality of mounting brackets on said crankcase includes an upper mounting bracket provided at a position higher than a cylinder of the engine, and a lower mounting bracket and a front mounting bracket provided at positions lower than said cylinder.

5. The engine mounting structure for motorcycles according to claim 2, wherein said uniform resilient member includes a cylindrical rubber baked integrally to an inner cylinder formed of a steel pipe, and is mounted by inserting the cylindrical rubber into an upper bracket of said crankcase.

6. The engine mounting structure for motorcycles according to claim 2, wherein each of said non-uniform resilient members includes an inner cylinder formed of a steel pipe and an upper core metal attached on an upper portion of the inner cylinder, a lower core metal attached on a lower portion of the inner cylinder, and a rubber having a non-uniform cross section, said rubber including a plurality of gear teeth shaped projections at a front and a rear thereof and uniform thickness sections on upper and lower portions thereof.

7. The engine mounting structure for motorcycles according to claim 3, wherein said positioning portion includes an upper and a lower positioning portion formed on and extending out from a perforated disc, and wherein said receiving portion is a lower mounting bracket on the vehicle body frame and is provided with an upper and a lower receiving portions and a semi-circular plate laid between the upper and lower receiving portions.

8. The engine mounting structure for motorcycles according to claim 1, wherein said plurality of resilient members includes two pairs of non-uniform resilient members and one pair of uniform resilient members.

9. The engine mounting structure for motorcycles according to claim 2, wherein each of said non-uniform resilient members includes a pair of upper and lower core metals disposed on an outer portion of a rubber.

10. An engine mounting structure for a vehicle, comprising:
    a front portion of a rear fork for supporting a rear wheel mounted on an engine so as to be capable of swinging in a vertical direction, the engine being provided with a plurality of mounting brackets;
    a vehicle body frame provided with a plurality of brackets corresponding to the mounting brackets on the engine; and
    a plurality of resilient members for connecting each of the plurality of mounting brackets on said engine with each of the plurality of corresponding brackets of the vehicle body frame, wherein
    at least one of the plurality of resilient members is a non-uniform resilient member having non-uniform resilient properties which are hard in a vertical direction and flexible in a fore-and-aft direction with respect to the vehicle body frame, and
    wherein a center of swinging motion of the rear fork coincides with a center of a crankshaft of the engine.

11. The engine mounting structure for a vehicle according to claim 10, wherein a first of the plurality of resilient members that is located at a position nearest to the rear wheel is a uniform resilient member having resilient properties which are uniform in the vertical direction and in the fore-and-aft direction, and others of said plurality of resilient members are said non-uniform resilient members having non-uniform resilient properties.

12. The engine mounting structure for a vehicle according to claim 10, further comprising:
    a positioning portion for determining the orientation in the vertical direction and in the fore-and-aft directions is provided on the at least one of the plurality of resilient members having non-uniform resilient properties;
    a receiving portion corresponding to the positioning portion is provided on the vehicle body frame.

13. The engine mounting structure for a vehicle according to claim 10, wherein said plurality of mounting brackets on said engine include an upper mounting bracket provided at a position higher than a cylinder of the engine, and a lower mounting bracket and a front mounting bracket are provided at positions lower than said cylinder.

14. The engine mounting structure for a vehicle according to claim 11, wherein said uniform resilient member includes a cylindrical rubber baked integrally to an inner cylinder formed of a steel pipe, and is mounted by inserting the cylindrical rubber into an upper bracket of said engine.

15. The engine mounting structure for a vehicle according to claim 11, wherein each of said non-uniform resilient members includes an inner cylinder formed of a steel pipe and an upper core metal attached on an upper portion of the inner cylinder, a lower core metal attached on a lower portion of the inner cylinder, and a rubber having a non-uniform cross section, said rubber including a plurality of gear teeth shaped projections at a front and a rear thereof and uniform thickness sections on upper and lower portions thereof.

16. The engine mounting structure for a vehicle according to claim 12, wherein said positioning portion includes an upper and a lower positioning portion formed on and extending out from a perforated disc, and wherein said receiving portion is a lower mounting bracket on the vehicle body frame provided with an upper and a lower receiving portions and a semi-circular plate laid between the upper and lower receiving portions.

17. The engine mounting structure for a vehicle according to claim 10, wherein said plurality of resilient members includes two pair of non-uniform resilient members and one pair of uniform resilient members.

18. The engine mounting structure for a vehicle according to claim 11, wherein each of said non-uniform resilient members includes a pair of upper and lower core metals disposed on an outer portion of a rubber.

19. The engine mounting structure for motorcycles according to claim 2, wherein the uniform resilient member is a cylindrical member having a uniform thickness.

20. The engine mounting structure for motorcycles according to claim 1, wherein the non-uniform resilient member includes a pair of core metals to provide the hard resilient properties in the vertical direction.

* * * * *